United States Patent [19]
Wu

[11] 3,976,996
[45] Aug. 24, 1976

[54] CONVERSION OF FSK TO NRZ CODING
[75] Inventor: Chin Tao Wu, New Brunswick, N.J.
[73] Assignee: RCA Corporation, New York, N.Y.
[22] Filed: June 4, 1975
[21] Appl. No.: 583,604

[52] U.S. Cl.......................... 340/347 DD; 178/66 R; 307/261; 325/163; 360/41; 360/42
[51] Int. Cl.² ........................................ H03K 13/24
[58] Field of Search ................ 360/41, 42; 307/261, 307/268; 332/9, 9 T; 329/104, 107; 325/163; 178/66; 340/347 DD Primary Examiner—John Kominski
Attorney, Agent, or Firm—Carl M. Wright; Edward J. Norton

[57] ABSTRACT

Circuit and method for converting FSK recorded data to NRZ by measuring time intervals between signals transitions of the same polarity.

4 Claims, 3 Drawing Figures

CONVERSION OF FSK TO NRZ CODING

BACKGROUND OF THE INVENTION

Frequency shift keying (FSK) is a data recording or transmission method whereby binary data is recorded or transmitted as one of two frequencies. It is sometimes called double pulse modulation, but this term also includes phase modulation (PM).

In FSK, a sequence of binary ones is recorded at twice (or half) the pulse rate of a sequence of binary zeroes. The ratio of frequencies, or pulse rates, need not be 2:1 but this ratio has many advantages. It is usually a result of compromise between bandwidth requirements and frequency filtering requirements.

Among the advantages of FSK are self-clocking, i.e., the pulse timing is included in the same signal with the data. FSK has narrow bandwidths compared with other recording or transmission techniques having comparable bit densities. This feature permits the use of narrow band filtering which improves the signal-to-noise-ratio and noise immunity. The spectral density of FSK reveals that most of the power (or energy) is contained in a narrow spectrum.

Among the disadvantages of FSK is the requirement for synchronization after signal loss by using special data conditions. At high frequencies, FSK usually operates in the descending region of the gap-loss curve of the reading head which results in pulse interference and low play back voltages. To reduce noise, a-c erasure is preferrable to d-c erasure.

Another disadvantage of FSK is the complex reading circuitry. Either sharp filters or phase-lock-loop circuits are used for reliable reading and these are sensitive to speed variations of the recording medium.

The invention disclosed herein permits the reading of FSK coded data using a simple circuit for decoding. This is especially useful when using inexpensive audio recorders as data input devices in small minicomputer or microcomputer systems. Speed variations, within certain limits, can be tolerated using the circuit of the invention. Furthermore, when used with asynchronous data terminals, such as Teletypes, multiple transitions used to indicate a cell time do not require a special decoder.

BRIEF DESCRIPTION OF THE INVENTION

Frequency shift keyed input signals are applied to a timing circuit which produces an output signal having a predetermined time duration. An output circuit responds to the input signals and the timing signal to produce an output signal which is concurrent with the timing signal when an input signal occurs during the duration of the timing signal.

DETAILED DESCRIPTION OF THE INVENTION

Figure 1:
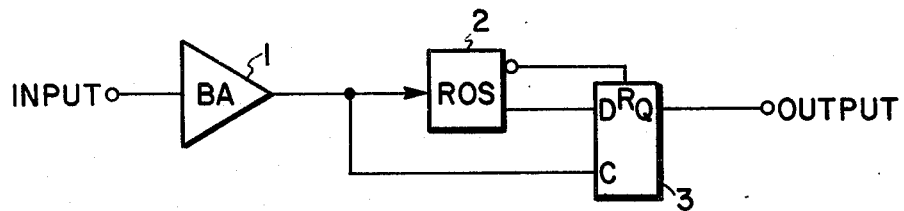
FIG. 1 is a logic diagram of a preferred embodiment of the invention.

In FIG. 1, the output signal from a source such as the earphone connection of an audio cassette recorder is applied to the input of a buffer amplifier 1. The buffer amplifier 1 matches the impedance of the source and provides a threshold which causes its output signal to assume one of two values depending on the relative value on the input signal. Such buffer amplifiers are well known in the art as Schmitt triggers, clipping amplifiers, and the like.

The output signal from the buffer amplifier 1 is applied to the clock input terminal of a D-type flip-flop 3 and to the input port of a retriggerable monostable multivibrator 2. A retriggerable monostable multivibrator (one-shot) produces an output signal for a predetermined time period when triggered by an input signal. Each successive input signal before the time duration of the output signal is completed causes the output signal timing to restart coincidentally with each input signal. A non-retriggerable one-shot, on the other hand, produces an output signal in response to an input signal but is not responsive to other input signals until the duration of the output signal is completed. Such devices are well known in the art; see, for example, integrated circuit type SN74122 (Texas Instrument Co.).

The normal, or Q, output signal from the retriggerable one-shot 2 is coupled to the D-input terminal of the flip-flop 3. The complemented, or $\bar{Q}$, output signal from the retriggerable one shot 2 is coupled to the reset terminal of the flip-flop 3.

A D-type flip-flop assumes a state which is determined by the value of the D-input signal just prior to the rising edge of the signal at the clock input, i.e., a short set-up time is required to prime the D-input circuit. Changes of the D-input signal between clock signals do not affect the state of the flip-flop. The reset input of the flip-flop causes the flip-flop to be reset when a high signal is applied thereto at any time, i.e., the reset signal is a direct input, not dependent on the clock signal.

Figure 2:
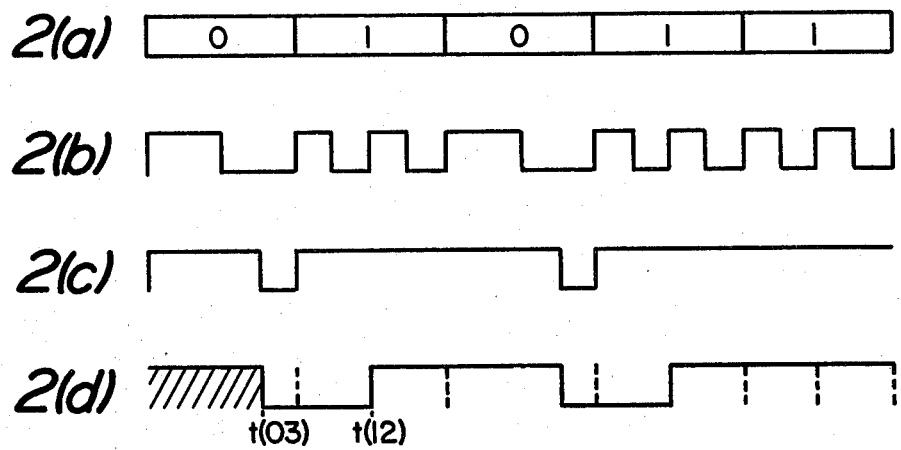
FIG. 2 is a timing diagram of idealized waveforms at various points in the circuit of the preferred embodiment.

Referring to FIG. 2, the operation of the circuit of FIG. 1 can be seen to provide an NRZ output signal in response to the FSK input signal.

FIG. 2(a) indicates the abscissa of the timing diagram divided into five cells storing, as an example, the binary values 01011. FIG. 2(b) is an idealized waveform which would appear as the output signal of the buffer 1 in response to an FSK signal representing the above binary sequence. It will be noted that the frequency for a binary zero is half the frequency of a binary one.

The period of the retriggerable one-shot 2 in FIG. 1 is approximately three-quarters of a zero period. FIG. 2(c) illustrates the idealized waveform of the Q output signal from the retriggerable one-shot 2. It can be seen from FIG. 2(c) that when a zero is recorded in a bit cell, the time required for a binary bit, the duration of the output signal from the one-shot is such that the one-shot is reset during a zero cell whereas in a one cell, the one-shot is retriggered so that it does not reset. FIG. 2(d) is an idealized waveform of the output signal from the flip-flop 3 in FIG. 1. The NRZ output signal from the flip-flop 3 has a phase relationship to the input signal of approximately 3/4 of a zero period. That is, the NRZ cell time for the first zero extends from t(03) to t(12). Dotted ordinates in FIG. 2(d) indicate the times at which the retriggerable one-shot 2 in FIG. 1 is retriggered.

From FIG. 1 and FIG. 2, it can be seen that a positive-going input signal triggers the retriggerable one-shot 2 in FIG. 1 and applies a clock pulse to the flip-flop 3 which causes the flip-flop to be set if the retriggerable one-shot were set at the occurrence of the rising edge of the input signal. If the retriggerable one-shot 2 were in the reset state, the flip-flop 3 will remain reset at the positive-going edge of the signal from the amplifier 1. The retriggerable one-shot 2, however, will be set and if the next positive-going edge of a signal from the buffer amplifier 1 occurs before the end of the one-shot's period, the flip-flop 3 will be set.

The reset terminal of the flip-flop 3 coupled to the $\overline{Q}$ output signal of the retriggerable one-shot 2 causes the flip-flop 3 to be reset immediately upon the termination of the output timing signal from the retriggerable one-shot 2. For this reason, an NRZ signal for a binary one is slightly longer than the signal for a binary zero.

Figure 3:
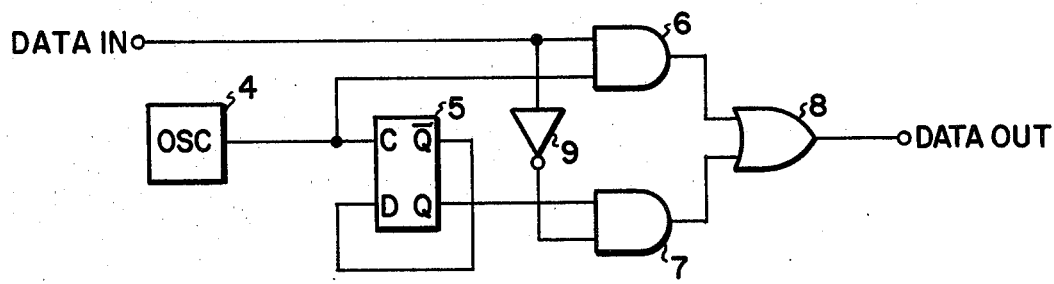
FIG. 3 is a logic diagram illustrating a circuit useful for recording FSK data to be read by the circuit of the invention.

FIG. 3 shows a circuit for recording NRZ data as FSK signals. An oscillator 4 runs at the higher frequency, e.g., that denoting a binary one. A D-type flip-flop 5 is coupled as a frequency divider which produces a signal at its Q output terminal having a frequency of half the output signal from the oscillator 4. The output signal from the oscillator 4 primes an AND gate 6 and the Q output signal from the flip-flop 5 primes an AND gate 7. The output signals of the AND gates 6 and 7 are combined in an OR gate 8. The data signal enables the AND gate 6 when the input data is a binary one. When the input data is a binary zero, the data signal is inverted to a binary one by means of an inverter 9 which enables the AND gate 7. When the AND gate 6 is enabled by a binary one, the output signal from the OR gate 8 is at the oscillator frequency, representing a binary one. When the input data is binary zero, the AND gate 7 couples the output signal from flip-flop 5 to the OR gate 8 to produce a signal representing a binary zero.

While a single period of the zero signal constitutes a cell time in the described embodiment, it is understood that a cell time may include several cycles of the zero (or lower) frequency.

Various modifications to the circuit described and illustrated to explain the concepts and modes of practicing the invention might be made by those of ordinary skill of the art within the principles or scope of the invention as expressed in the appended claims.

What is claimed is:

1. A system for converting frequency shift keyed input signals to non-return-to-zero output signals comprising the combination of:
    timing means responsive to the input signals for producing a timing signal with a predetermined time duration; and
    output means responsive to the input signals and to said timing signal for producing an output signal concurrent with said timing signal when an input signal occurs during the duration of the timing signal.

2. The invention as claimed in claim 1 wherein said timing means includes a retriggerable monostable multivibrator.

3. The invention as claimed in claim 2 wherein said output means includes a D-type flip-flop coupled to receive the input signals at a clock terminal, the timing signal at a data terminal, and a complement of the timing signal at a reset terminal.

4. The invention as claimed in claim 1 wherein said predetermined time duration is approximately 75% of a cell time.

* * * * *